March 14, 1967 A. R. ANDERSON ETAL 3,308,666
HIGH TEMPERATURE MEASURING DEVICES
Filed April 29, 1963 3 Sheets-Sheet 1
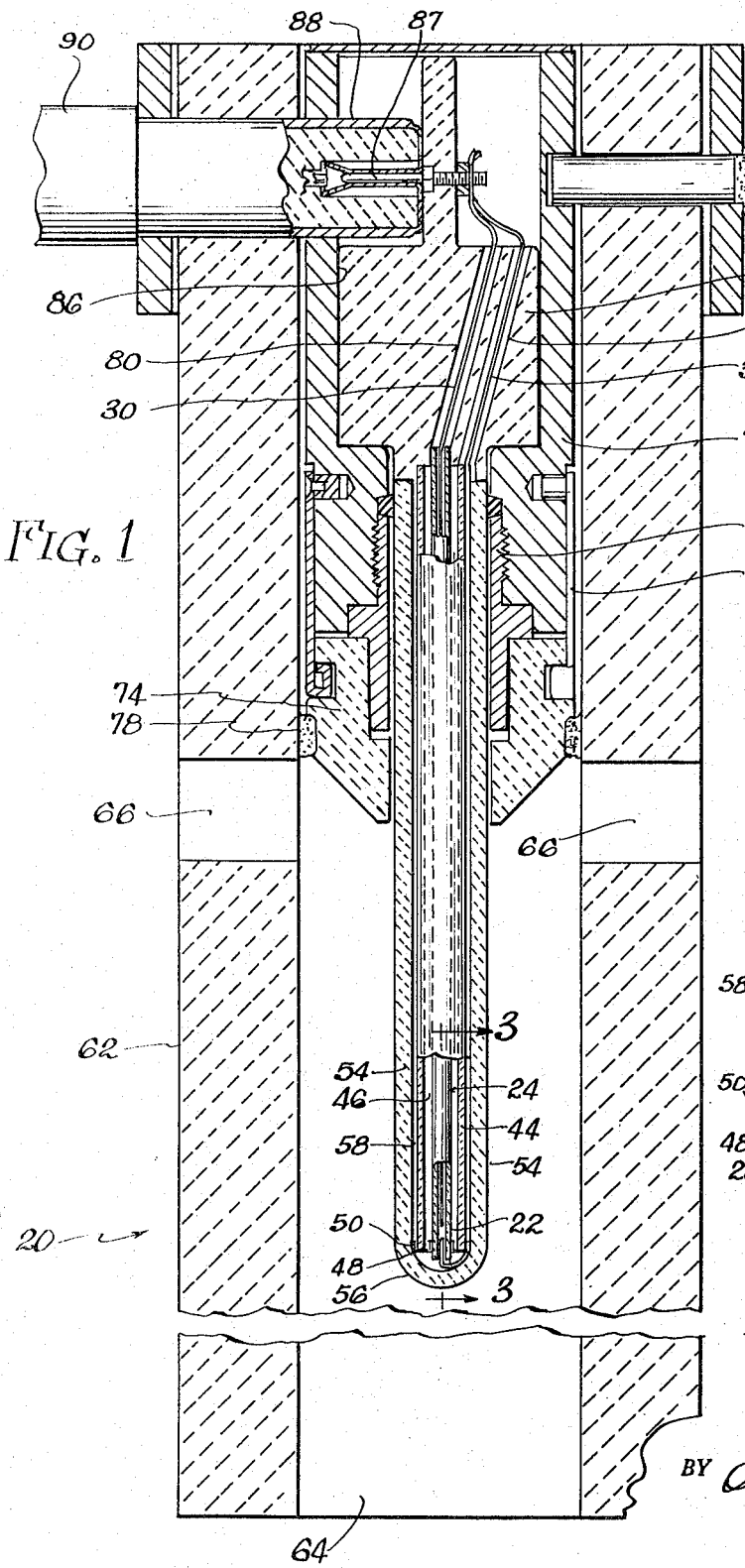
FIG. 1
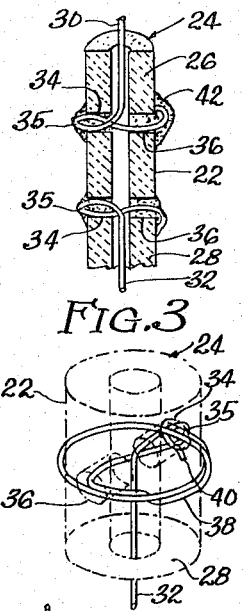
FIG. 3
FIG. 4
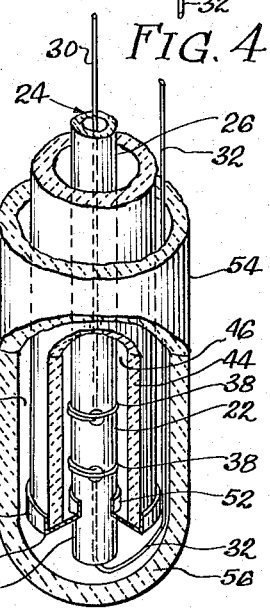
FIG. 2
Truman M. Stickney
Arthur R. Anderson
Donald W. Gordon
INVENTORS
BY Ooms, McDougall
and Hersh
Attys March 14, 1967 A. R. ANDERSON ETAL 3,308,666
HIGH TEMPERATURE MEASURING DEVICES
Filed April 29, 1963 3 Sheets-Sheet 2
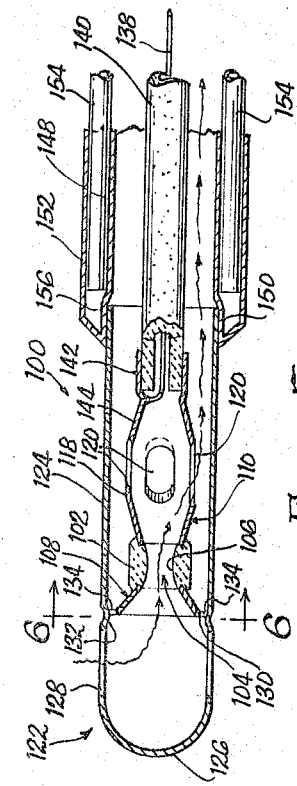
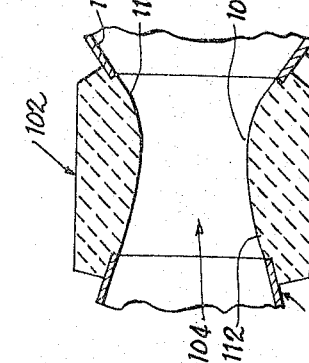
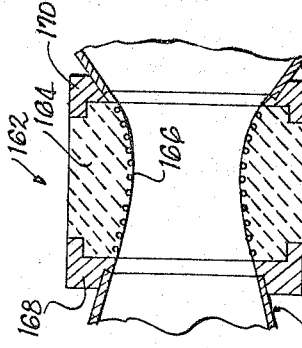
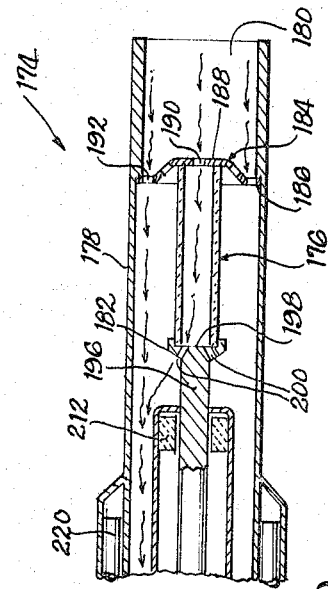
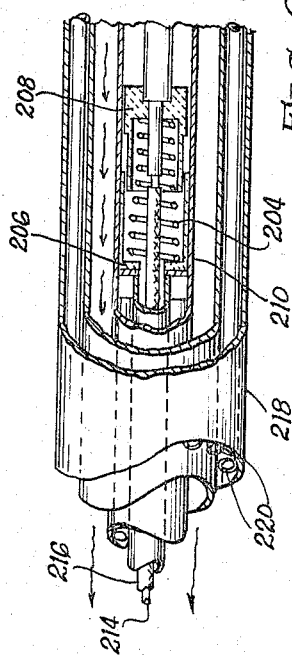
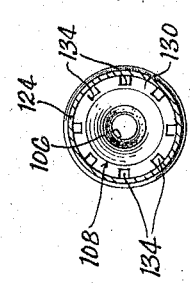
Truman M. Stickney
Arthur R. Anderson
Donald W. Gordon
INVENTORS
BY Ooms, McDougall
and Hersh
Attys

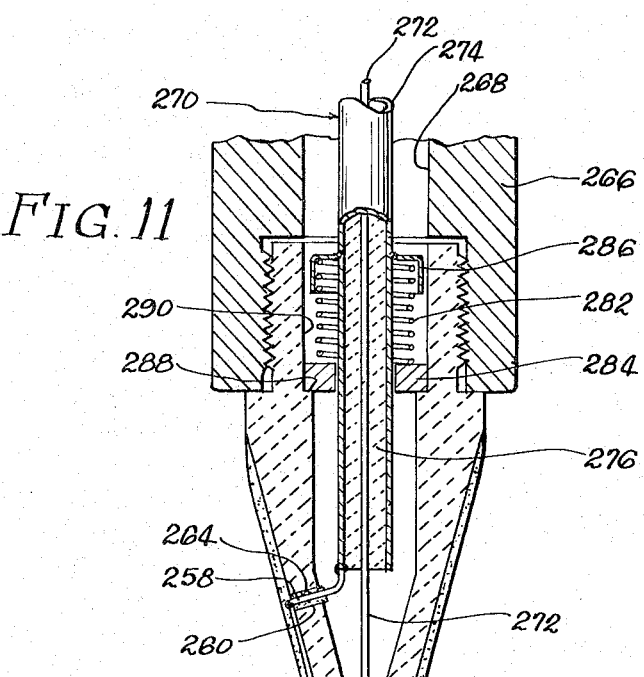
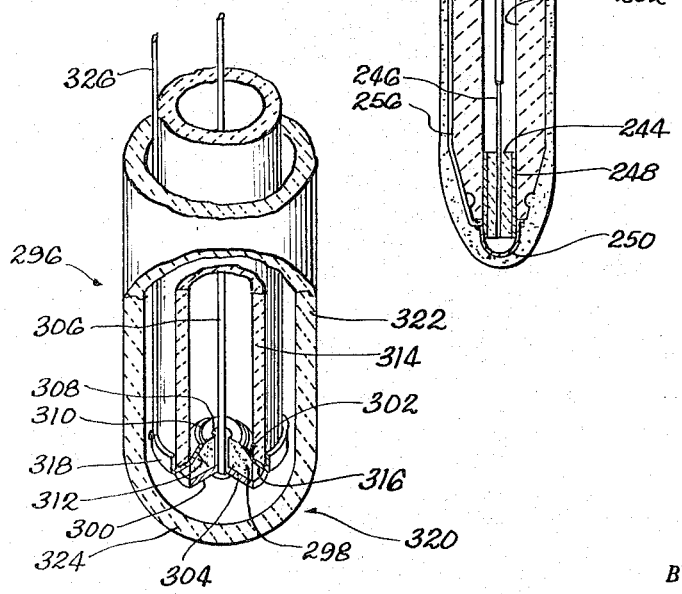

United States Patent Office 3,308,666
Patented Mar. 14, 1967

3,308,666
HIGH TEMPERATURE MEASURING DEVICES
Arthur R. Anderson, Glenview, Truman M. Stickney, Morton Grove, and Donald W. Gordon, Chicago, Ill., assignors to Cook Electric Company, Morton Grove, Ill., a corporation of Delaware
Filed Apr. 29, 1963, Ser. No. 276,614
11 Claims. (Cl. 73—362)

This invention relates to devices for continuously measuring extremely high temperatures which may be in the range from 2,000° to 3,200° Fahrenheit, or even higher, for example.

One object of the present invention is to provide new and improved temperature measuring devices utilizing resistor elements for sensing the high temperatures to be measured.

A further object is to provide new and improved temperature measuring devices of the foregoing character in which changes in the temperature being measured cause changes in the resistance of the sensing element, such resistance being employed to indicate the temperature being measured.

Another object is to provide new and improved high temperature measuring devices utilizing temperature sensing resistor elements of the type which have very low conductivity and thus are good insulators at ordinary room temperatures, but have the characteristic of progressively increasing conductivity, or decreased resistance, at extremely high temperatures.

It is a further object to provide new and improved high temperature measuring devices of the foregoing character, utilizing resistor elements made of refractory metallic oxides, such as alumina, magnesia, beryllia, or the like, having the property of progressively decreasing resistance with increasing temperature at extremely high temperature ranges above about 2,000° F.

Another object is to provide new and improved high temperature measuring devices in which the temperature sensing resistor element is arranged coaxially within a protective shield or casing so that the sensing element is adequately protected against breakage or damage due to uneven heating, heat shock, and mechanical factors.

Another object is to provide a new and improved high temperature measuring device in which the temperature sensing element takes the form of a portion of an axial tube made of a refractory metallic oxide, and in which metallic leads are brought to the sensing element through the axial tube and also between the walls of protective refractory tubes disposed coaxially around the axial tube.

It is a further object to provide new and improved high temperature measuring devices in which the temperature sensing element is formed as a tubular axial nozzle through which gases, the temperature of which is to be measured, are caused to pass.

A further object is to provide a new and improved high temperature measuring device in which the temperature sensing element takes the form of an axial disk or wafer which is compressed between metallic electrodes for establishing electrical contact with the wafer.

Another object is to provide a new and improved high temperature measuring device in which the temperature sensing element takes the form of a nozzle section cemented between tubular metallic sections which direct hot gases into and out of the nozzle section and also serve as electrodes for establishing electrical contact with the nozzle section.

It is another object to provide a new and improved high temperature measuring device in which the temperature measuring element takes the form of an axial tube compressed between metallic electrodes engaging the ends of the tube.

A further object is to provide a new and improved high temperature measuring device in which the temperature sensing element is compressed between the inside of a cylindrical electrode and a wire or rod extending axially within the cylindrical electrode.

Another object of the present invention is to provide new and improved high temperature measuring devices having a useful service life and capable of giving results which are accurate, constant and reproducible. Further objects and advantages of the present invention will appear from the following description, taken with the accompanying drawings, in which:

FIG. 1 is a somewhat diagrammatic longitudinal sectional view of a high temperature measuring device constituting one illustrative embodiment of the present invention.

FIG. 2 is a fragmentary enlarged perspective view, partly in section, to illustrate various details of the temperature sensing probe employed in the device of FIG. 1.

FIG. 3 is a fragmentary sectional view of the temperature sensing element taken generally along a line 3—3 in FIG. 1.

FIG. 4 is a fragmentary enlarged diagrammatic perspective view showing the manner in which one of the metallic leads may be securely connected to the temperature sensing element of FIG. 1.

FIG. 5 is a longitudinal section taken through a temperature measuring probe or device constituting a second illustrative embodiment of the present invention.

FIG. 6 is a cross-sectional view taken generally along the line 6—6 in FIG. 5.

FIG. 7 is an enlarged fragmentary sectional view, corresponding to a portion of FIG. 5, and showing the nozzle section which also serves as the temperature sensing element.

FIG. 8 is a view similar to FIG. 7 but showing a modified nozzle section which incorporates a temperature sensing element in the form of a coil of metallic wire.

FIG. 9 is a longitudinal sectional view showing a modified nozzle type temperature measuring device constituting a third illustrative embodiment of the present invention.

FIG. 10 is a longitudinal section of a modified temperature measuring device somewhat similar to that of FIG. 9 but constituting a fourth illustrative embodiment of the present invention.

FIG. 11 is a longitudinal section showing another high temperature measuring probe constituting a fifth illustrative embodiment of the present invention.

FIG. 12 is a fragmentary perspective view, partly in section, and showing a high temperature measuring device constituting still another embodiment of the present invention.

As already indicated, FIGS. 1-4 illustrate a device or probe 20 for measuring high temperatures which may be in the range from 2,000° to 3,000° F. or even higher, for example. The probe 20 of FIG. 1 is particularly useful for direct immersion in molten metals to measure the temperature thereof.

The probe 20 comprises a temperature sensing element 22 which constitutes a portion of the length of a ceramic tube 24 extending along the axis of the probe. The tube 24 is made of a material which has an extremely low conductivity, and thus is a good insulator at ordinary room temperatures, but exhibits a definite and progressively decreasing resistivity with increasing temperature in the high temperature range for which the probe is intended to be used. Such materials include refractory vitrified metallic oxides such as alumina, magnesia and beryllia, for example.

In addition to the sensing element or portion 22, the tube 24 has an inner supporting portion 26, which supports the sensing portion 22, and an outer portion 28 which extends beyond the sensing portion 22. Electrical connections are established at the opposite ends of the sensing portion 22 by conductive metallic leads 30 and 32 which are secured or anchored to the tube 24 at spaced points representing the ends of the sensing element 22. The lead 30 extends through the supporting portion 26 of the tube 24 to one end of the sensing portion 22. The lead 32 extends through the outer projecting portion 28 of the tube 24.

Various arrangements may be employed to secure or anchor the leads 30 and 32 to the tube 24 at the opposite ends of the sensing portion 22. The illustrated anchoring arrangement is disclosed and claimed in the copending patent application of Arthur R. Anderosn, Truman M. Stickney and Donald W. Gordon, Ser. No. 99,462, filed March 30, 1961, now Patent No. 3,131,562. The arrangement whereby the leads 30 and 32 are wrapped around the tube 24 and securely knotted is shown to best advantage in FIGS. 3 and 4. Thus, each of the leads or wires 30 and 32 is brought out from the inside of the tube 24 through a hole 34 which is formed in the wall of the tube. The wire is then doubled back through the hole 34 so as to form a loop 35, and then is brought out through a second hole 36 which is formed in the tube 24, diametrically opposite from the hole 34. The projecting end of the wire is then wrapped tightly around the circumference of the tube 24, to form a turn or wrapping 38. It will be seen that the end of the wire is passed under the turn 38, through the loop 35, and again under the turn 38. The extreme end portion is doubled back around the loop 35 and against the outer surface of the tube 24. Of course, a separate set of holes 34 and 36 is provided for each of the wires 30 and 32. The ends of the wires 30 and 32 may be cemented to the tube 24 by filling the holes 34 and 36 and covering the adjacent exposed portions of the wires with a high temperature cement 42 such as firebrick mortar.

The leads or wires 30 and 32 may be made of various metals which will withstand the high temperatures at which the probe is intended to be exposed. Thus, wires 30 and 32 may be made of a refractory metal such as tantalum, or the noble metals such as platinum or rhodium or a platinum-rhodium alloy.

As shown to best advantage in FIGS. 1 and 2, the tube 24 is disposed axially within a shield or protective tube 44, made of a refractory insulating ceramic material, preferably a vitrified metallic oxide, similar to the materials of which the tube 24 is made. However, the protective tube 44 may in some cases be made of a less expensive foundry-type ceramic such as fire clay. A definite air space 46 is provided between the central tube 24 and the concentric protective tube 44, to provide for adequate insulation of the sensing element 22 at high temperatures.

In this case, a centering ring 48 is mounted on the outer end of the protective tube 44 and is received around the outer end portion 28 of the tube 24 to support and center the tube 24 within the tube 44. The ring 48 has an outer flange 50 which is tightly received around the tube 44, and an inner flange 52 closely received around the tube 24. The ring 48 may be made of a temperature resistant metal, such as tantalum or a platinum-rhodium alloy.

The sensing element 22 is protected from direct contact with the molten metal by a cylindrical casing or shell 54 which is mounted concentrically around the protective tube 44. The casing 54 is formed with a closed lower wall 56 which may be generally dome-shaped. An air space 58 is preferably provided between the protective tube 44 and the casing 54. It will be seen that the lead 32 is brought out of the lower end of the tube 24 and then is brought upwardly between the protective tube 44 and the casing 54. It will be understood that the casing 54 is made of a ceramic material which will withstand the high temperatures at which the probe is to be exposed. Preferably, the material employed in the casing 54 is nonporous, but it is sometimes satisfactory to make the casing 54 out of relatively porous and inexpensive foundry-type ceramics such as fire clay. As further protection against the molten metal, the probe 20 is provided with a heavy outer sleeve 62 which is mounted concentrically around the casing 54. It will be seen that the sleeve 62 is considerably larger than the casing 54 and has a much greater wall thickness. The sleeve 62 has an open lower end 64 to admit the molten metal so that it may contact the casing 54. Two or more equally spaced openings 66 are preferably provided in the wall of the sleeve 62 to provide for circulation of the molten metal through the space within the sleeve 62.

The outer sleeve 62 protects the probe from forces developed in the molten metal due to agitation of the metal. However, the molten metal is allowed to come into direct contact with the outer casing 54. The coaxial mounting of the tube 24 within the casing 54 insures that the temperature sensing element 22 will be heated uniformly, so as to be protected against breakage or damage due to heat shock. Moreover, the sensing element 22 is adequately protected against mechanical damage.

Various arrangements may be provided to connect and support the various components of the probe. As shown, the outer casing 54 is mounted within a metal bushing 70 which is screwed into a cylindrical member 72. The lower end of the metal bushing 70 is covered by a ceramic collar 74 which is detachably connected to the member 72 by a suitable metal connector 76. Refractory cement 78 may be provided between the ceramic collar 74 and the inside of the protective sleeve 62.

The upper ends of the leads 30 and 32 extend through holes 80 and 82 which are formed in an insulating block 84. A bore 86 is formed in the member 72 to receive the insulating block 84. The leads 30 and 32 may be connected to a pair of prongs or terminals 87 adapted to be engaged by a detachable connector 88 on the end of an electrical cable 90. It will be understood that the cable 90 is connected to an electrical or electronic instrument for measuring the electrical resistance of the probe.

At ordinary room temperatures, the vitrified alumina, or other similar material employed in the tube 24, is a good electrical insulator, so that the electrical resistance of the sensing element 22 is extremly high. However, at temperatures above approximately 2,000° F., the resistance of the sensing element 22 is greatly reduced, so that it is capable of easy and accurate measurement. The resistance of the sensing element decreases progressively with increasing temperature. Thus, the probe may be calibrated so that its resistance will be an accurate indication of the temperature of the sensing element. The resistance, and hence the temperature, may be monitored continuously.

Throughout the temperature range to be measured, the resistance of the wire leads 30 and 32 is extremely low compared to the resistance of the ceramic sensing element 22. Thus, the leads 30 and 32 provide low resistance connections to the ends of the temperature sensing element 22, so that the calibration of the probe is not affected to any appreciable extent by the decrease in the resistance of the protective tube 44 and the casing 54, with increasing temperature.

The coaxial arrangement of the supporting and insulating tubes 24, 44 and 54 provides a very compact probe structure, while maintaining adequate air spacing around the sensing element 22 to assure that the electrical insulation of the sensing element will be maintained. Thus, the sensing element is adequately insulated against short-circuiting and grounding effects at high temperatures.

FIGS. 5–7 illustrate a modified temperature measuring device or probe 100 which is adapted particularly for measuring the temperature of extremely hot gases, such as those derived from a turbojet aircraft engine or any other source of hot gases. In this case, the temperature measuring probe 100 comprises a temperature sensing element 102 in the form of a tubular nozzle section through which the hot gases are caused to pass at high velocity. It will be seen that the sensing element 102 is annular in shape and is provided with an axial flow passage 104 of the Venturi type, formed with a constricted throat 106. The nozzle-shaped sensing element 102 is preferably made of a refractory material having an electrical resistivity which is extremely high at low temperatures but decreases progressively with increasing temperatures, particularly in the range above approximately 2,000° F. Thus, the sensing element 102 may be made of materials similar to those employed in the sensing element 22 of FIG. 1, including vitrified metallic oxides such as alumina, magnesia and beryllia.

The hot gases are carried into and out of the nozzle-shaped sensing element 102 by tubular members 108 and 110 connected to the opposite ends of the sensing element. The tubular members 108 and 110 are preferably made of metal or other conductive material so that these members will also serve to establish electrical connections to the opposite ends of the sensing element 102. For example, the tubular members 108 and 110 may be made of heat-resisting metals such as tantalum and platinum alloys. The tubular members 108 and 110 may be cemented or bonded to the nozzle-shaped sensing element 102. Such bonding may be accomplished by firing the nozzle section 102 after the nozzle section has been molded and fitted with the tubular members 108 and 110.

It will be seen that the tubular section 108 tapers toward the nozzle section 102 and merges smoothly with the tapering entrance 112 to the axial passage 104 in the nozzle section 102. The flaring exit portion 114 of the passage 106 merges smoothly with the tubular member 110, which has a flaring entrance portion 116 connecting with a substantially cylindrical portion 118. It will be seen that the cylindrical portion 118 is formed with a plurality of openings 120 through which the hot gases pass out of the tubular member 110.

The probe 100 is provided with a protective outer casing 122 which is illustrated as having a cylindrical side wall 124, closed at its outer end by a dome-shaped end wall 126. It is preferred to make the casing 122 of a heat-resistant metal or other electrically conductive material so that the casing will provide an electrical connection to the tubular member 108.

It will be seen that a plurality of openings 128 are formed in the side wall 124 of the casing 122 to admit the hot gases to the casing. A tubular member 108 is mounted within the casing 122 to the right of the openings 128, as shown in FIG. 5. It will be seen that the tubular member 108 is formed with an outwardly projecting flange 130 which engages the inside of the side wall 124. An inwardly projecting annular bead or rib 132 may be formed in the side wall 124 for engagement by the flange 130. It will be understood that the flange 130 may be welded to the side wall 124 or may simply be pressed into place against the bead 132.

In this case, the tubular member 108 is formed with a plurality of bypass openings 134 which preferably extend through the flange 130. The openings 134 permit a portion of the hot gases entering the casing 122 to pass through the tubular member 108 and around the outside of the nozzle-shaped sensing element 102, between the sensing element and the cylindrical casing wall 124. Thus, the hot gases engage both the inside and the outside of the nozzle-shaped sensing element 102 so as to provide for extremely effective heat transfer between the gases and the sensing element.

In this case, an electrical connection is established to the tubular member 110 by a lead or wire 138 having its left-hand end welded or otherwise secured to the member 110. The lead 138 extends through a refractory insulating tube 140 which is connected to the right-hand end of the tubular member 110. In this case, the tube 140 is tightly mounted within a cylindrical end portion 142 on the tubular member 110. A tapering section 144 is formed on the tubular member 110 between the cylindrical sections 118 and 142. The insulating tube 140 may be made of a vitrified metallic oxide, such as alumina, or in some cases it may be made of a low-grade foundry-type material such as fire clay.

In this case, the right-hand end of the cylindrical casing wall 124 is connected to a suction pipe or casing 148 which draws off the gases from the casing 122 and thus causes the gases to travel at extremely high velocity through the nozzle section 102. As shown, the suction pipe 148 has a slightly enlarged end portion 150 into which the end of the cylindrical casing 124 is tightly fitted. The right-hand end of the suction pipe 148 may be connected to a suction pump or blower, not shown. With this arrangement, the hot gases can be made to pass through the nozzle section 102 at sonic or near-sonic velocity. The high velocity of the gases promotes the efficient transfer of heat between the gases and the nozzle-shaped sensing element 102.

In the illustrated construction, the suction pipe 148 is provided with an outer jacket 152 to provide for the circulation of water or some other cooling fluid around the pipe 148. A plurality of spaced, longitudinally extending tubes or pipes 154 may be inserted into the space 156 between the pipe 148 and the jacket 152. Cooling water or other fluid may be pumped into the space 156 through the pipes 154 and may be allowed to escape from the space 156 through the spaces between the pipes 154. It will be realized that the pipe 148 and the jacket 152 may be supported in any suitable manner.

In actual operation, the probe 100 is inserted into the chamber, passage, or conduit containing the hot gases, the temperature of which is to be measured. Suction is applied to the pipe 148 so that the hot gases are drawn into the casing 122 through the openings 128. The gases pass through the nozzle 102 at sonic or near-sonic velocity. In addition, the gases pass through the openings 134 and around the outside of the nozzle 102. To obtain an indication of the temperature of the nozzle 102, the electrical resistance is measured between the lead 138 and the casing 122. This resistance may be continuously monitored. For high temperatures, the resistance of the nozzle section 102 decreases as a function of increasing temperature. The probe may be calibrated so that the resistance readings may be converted into temperature readings.

FIG. 8 illustrates a modified sensing element 162 which includes a nozzle 164, as in the case of the sensing element 102. However, the sensing element 162 employs a metallic resistor in the form of a coil or winding of wire 166, embedded in the inner surface of the ceramic nozzle member 164. The ends of the wire coil 166 are connected to metallic or other conductive rings 168 and 170, which, in turn, are secured to the ends of the tubular members 108 and 110. The nozzle 164 is preferably made of a ceramic material such as vitrified alumina, magnesia or beryllia. The wire 166 and the rings 168 and 170 may be made of heat resistant metals such as platinum alloys or tantalum.

It will be understood that hot gases are caused to pass through the nozzle 164 as in the case of the nozzle 102. Due to the use of the wire coil 166, the sensing element 162 is primarily adapted for measuring somewhat lower temperatures than the sensing element 102 of FIGS. 5–7.

The axial disposition of the nozzles 102 and 164 in the arrangements of FIGS. 5–8 assures uniform heating of the nozzles. In this way, warping of the nozzles or damage due to heat shock is avoided.

FIG. 9 illustrates another temperature measuring device 174 which is adapted to measure the temperature of hot gases. In this case, the temperature measuring device 174 employs a temperature sensing element 176 in the form of a generally cylindrical nozzle or tube 176 made of a material which is electrically conductive at high temperatures. As before, it is preferred to make the sensing element 176 of a material, such as vitrified alumina, magnesia or beryllia, having a resistance which decreases with increasing temperature.

It will be seen that the tubular sensing element 176 is disposed axially within a substantially cylindrical protective casing 178 having an open outer end 180 through which the hot gases may enter the casing. The sensing element 176 is compressed endwise between conductive electrodes 182 and 184, preferably made of a heat-resistant metal, such as a platinum alloy or tantalum. The outer casing 178 may also be made of a heat-resistant metal.

The illustrated electrode 184 is in the form of a disk which is closely received within the casing 178 and is seated against a shoulder 186 formed in the casing. The disk 184 has a centrally disposed cup-shaped depression 188 adapted to receive and lock the right-hand end of the tubular sensing element 176, as shown in FIG. 9. A central opening 190 is formed in the disk 184 to admit the hot gases into the right-hand end of the sensing element 176. The illustrated disk 184 also has a plurality of bypass openings 192 spaced away from the center of the disk so that some of the hot gases can pass through the disk 184 without entering the tubular sensing element 176. These gases come into engagement with the outside of the sensing element 176 so that the sensing element is heated from both the inside and the outside.

The illustrated electrode 182 takes the form of an enlarged head at the right-hand end of an axial rod 196. It will be seen that the electrode 182 is formed with a recess 198 for receiving the left-hand end of the tubular sensing element 176. As shown, openings 200 extend through the electrode 182 to permit the flow of the hot gases out of the left-hand end of the tubular sensing element 176 and into the casing 178. Thus, some of the hot gases flow into the sensing element 176 through the opening 190, and out of the sensing element through the openings 200.

In the probe 174, the cylindrical casing 178 extends a substantial distance to the left of the sensing element 176 to carry off the hot gases. If desired, the left-hand end of the casing 178 may be connected to a suction pump. Alternatively, the left-hand end of the casing 178 may merely be connected to the atmosphere. In that case, the gases are forced through the tubular sensing element 176 by the gas pressure existing at the entrance 180 to the casing 178.

As already indicated, the electrodes 182 and 184 are employed to establish electrical connections to the opposite ends of the tubular sensing element 176. In the illustrated construction, a spring 204 is employed to press the electrode 182 with considerable force against the tubular sensing element 176. The illustrated spring 204 is compressed between cup-shaped members 206 and 208. The cup-shaped member 206 is stationary and is secured within an inner guide tube 210. The member 208 is slidable within the tube 210 and is mounted on the left-hand end of the rod 196. The right-hand end portion of the rod 196 is slidably guided by a bushing 212 mounted within the right-hand end of the tube 204.

To make an electrical connection to the electrode 182, a flexible lead or wire 214 may be connected to the left-hand end of the rod 196. The lead 214 is covered with an insulating sheath 216.

To cool the left-hand portion of the outer casing 178, a cylindrical jacket 218 is provided around the casing. Cooling water or other fluid may be circulated through the space between the casing 178 and the jacket 218. Tubes 220 may be employed to introduce and circulate the cooling water within the jacket 218.

It will be noted that the tubular sensing element 176, the casing 178, the electrodes 182 and 184, and the guide tube 204 are coaxially disposed. Thus, this construction provides a compact arrangement in which the sensing element 176 is uniformly and quickly heated.

FIG. 10 illustrates a somewhat modified temperature measuring probe 226 in which the sensing element 176 and the electrodes 182 and 184 are the same as in the probe 174 of FIG. 9. Moreover, the probe 226 has a cylindrical outer casing 178a which is the same as the casing 178 except that the casing 178a terminates a short distance to the left of the sensing element 176 to provide an annular opening 228 through which the gases may escape after passing through and around the sensing element 176.

The probe 226 employs an inner guide tube 210a which is very similar to the guide tube 210 except that a jacket 230 for cooling water is mounted directly around the tube 210a. The rod 196, spring 204, cup-shaped members 206 and 208, and bushing 212 are the same as in FIG. 9. Tubes 236 may be provided between the jacket 230 and the guide tube 210a to introduce the cooling water or other fluid.

In the probes of FIGS. 9 and 10, the resistance is measured between the lead 214 and the casing 178 or 178a. The cup-shaped members 206 and 208 and the guide bushing 212 are made of insulating materials to avoid grounding the rod 196 to the casing. Preferably, these insulating components are made of a high-grade ceramic such as vitrified alumina. The use of the cooling fluid prevents the insulating components 206, 208 and 212 from being heated sufficiently to impair their insulating properties.

FIG. 11 illustrates another high temperature measuring probe 242 which is well adapted for measuring the temperature in a metallurgical furnace or the like. The probe may be immersed directly in a pool of molten metal. In this case, the probe 242 comprises a temperature sensing element 244 in the form of a cylinder of resistive material compressed between an axial wire 246, serving as an inner electrode, and a hollow cylindrical outer electrode 248. The electrodes 246 and 248 are made of conductive material, preferably a heat-resistant metal such as a platinum alloy or tantalum. As in the case of the other probes, the resistive material 244 is preferably of the type having a resistivity which decreases progressively with increasing temperature. Thus, the sensing element 244 may be made of a metallic oxide such as alumina, magnesia or beryllia. The material for the sensing element 244 may initially be in powdered form and may be compressed within the metal cylinder 248. The powdered material may then be fired or sintered so that it becomes a solid mass.

In the illustrated construction, the lower or outer end of the cylindrical electrode 248 is covered with a dome-shaped cap 250 which may be made of a heat-resistant metal. The cylinder 248 is received within an axial bore 252 formed in a tubular supporting member 254, which may be made of a relatively low-grade ceramic material, such as fire clay. A lead or wire 256 is connected to the cylinder 248 and is disposed along the outside of the supporting member 254. The upper end of the lead 256 is connected to a feed-through wire or lead 258 extending through an opening 260 in the wall of the supporting member 254.

It will be seen that the outer surface of the supporting member 254 is covered wtih a sheath 262 which may be made of a suitable ceramic, such as a chromium base sealing cement. The ceramic cement may also be employed to form a plug 264 in the opening 260 around the lead 258.

The supporting member 254 may be screwed into or otherwise removably secured to a heavier supporting member 266, made of a ceramic material or a heat-resistant metal. The support 266 is formed with a bore 268 for receiving a coaxial electrical connecting cable or member 270.

It will be seen that the electrical cable 270 comprises an axial wire or rod 272 and a conductive cylindrical sheath 274. An electrically insulating material 276 is received between the axial wire 272 and the outer sheath 274. The insulating material 276 preferably takes the form of a heat-resistant ceramic material.

It will be seen that the lower end of the conductive sheath 274 is connected to the lead-through wire 258. The axial wire 272 extends downwardly below the lower end of the sheath, through the bore 252 in the supporting member 254, and is connected to the axial wire 246 of the sensing element 244. It will be evident that there is an ample air space around the axial leads 246 and 272 to provide good electrical insulation and prevent grounding of the axial leads.

To maintain tension on the axial leads 246 and 272, means are provided to urge the electrical cable 270 upwardly. In this case, such means comprise a coil spring 282 compressed between a stationary disk 284 and a cup-shaped member 286 secured to the outer sheath 274 of the electrical cable. The disk 284 is seated against a shoulder 288 at the lower end of an enlarged bore 290 in the supporting member 254. The lead-in wire 258 is sufficiently flexible to avoid interference with the action of the spring 282.

When the probe 242 is used, the electrical resistance is measured between the axial lead 272 and the outer sheath 274. With increasing temperature, the resistance of the sensing element 244 decreases. The probe may be calibrated so that the resistance readings may be converted to temperature values.

FIG. 12 illustrates another modified high temperature measuring device 296 which employs a sensing element 298 in the form of an axially disposed disk or wafer, preferably made of a refractory metallic oxide, such as alumina, magnesia or beryllia, for example. Circular electrodes 300 and 302 are employed to make electrical contact with the sensing element 298. It will be seen that the sensing element 298 has a flat lower surface 304 which is engaged by the electrode 300. As shown, the electrode 300 is in the form of a flat circular disk. A lead 306 is connected to the center of the electrode 300 and extends upwardly therefrom through an axial opening 308 in the sensing element 298. The opening 308 is substantially larger than the wire 306 to provide an air space around the wire.

In this case, the wafer-shaped sensing element 298 has an upwardly-facing frustoconical surface 310 which is engaged by a frustoconical portion 312 of the electrode 302. It will be seen that the electrode 302 is mounted on the lower end of a cylindrical supporting tube 314, preferably made of a ceramic insulating material, which may be a vitrified metallic oxide such as alumina, or a foundry-type ceramic such as fire clay. The electrode 302 has an outwardly extending flange 316 which engages the lower end of the supporting tube 314, and an upwardly projecting annular flange 318, received closely around the lower end portion of the tube 314.

The sensing element 298 is protected by an outer casing 320 having a cylindrical side wall 322 which is closed at its lower end by a dome-shaped end wall 324. The casing 322 is preferably made of a heat-resistant ceramic material, which may be a foundry-type ceramic such as fire clay.

A lead or wire 326 is connected to the electrode 302 and is brought upwardly between the supporting tube 314 and the outer casing 320.

As in the case of the probe of FIG. 11, the axial lead 306 is kept under tension so that the electrode 300 is firmly pressed against the lower side of the sensing element 298. The upward force on the sensing element produces firm contact pressure between the sensing element and the electrode 302. The probe 296 of FIG. 12 may be substituted for the lower portion of the high temperature measuring device 242 of FIG. 11, so that the spring 282 may be employed to apply tension to the axial lead 306. The electrodes 300 and 302 and the leads 306 and 326 are made of conductive material, preferably heat-resistant metals, such as platinum alloys or tantalum.

In each of the disclosed embodiments, the sensing element and the members which support and protect it are coaxially arranged. The sensing element is received axially within the protective member or members. Each of these arrangements provides a compact construction in which the sensing element is heated uniformly from all sides. Moreover, the sensing element is adequately protected so as to avoid damage due to heat shock and mechanical factors.

The temperature measuring devices may be accurately calibrated so that the resistance of each device may be measured and converted into temperature readings. Reasonable service life is afforded by the temperature measuring devices, despite the extremely high temperatures which are involved.

Various modifications, alternative constructions and equivalents may be employed without departing from the true spirit and scope of the invention, as exemplified in the foregoing description and defined in the following claims.

We claim:

1. In a device for measuring high temperatures, the combination comprising a protective casing,
a temperature sensing element disposed within said casing along the axis thereof,
said element being made of a material having progressively decreasing electrical resistance with increasing temperature,
a pair of electrodes making electrical contact with opposite axial end portions of said element and disposed coaxially relative thereto,
and means coaxial with said sensing element engaged with said axial end portions thereof and supporting said sensing element within said casing with said casing being spaced outwardly from said sensing element.

2. In a device for measuring high temperatures, the combination comprising a protective casing,
a tubular temperature sensing element positioned within said casing and coaxial therewith said casing being spaced outwardly from said sensing element,
said sensing element being made of a material having progressively decreasing resistance with increasing temperature,
a pair of conductive electrodes coaxial with said tubular sensing element and making electrical contact with opposite end portions thereof,
and a tubular supporting member mounted coaxially within said casing and supporting said tubular sensing element, said conductive electrodes extending through said tubular supporting member to said sensing element from opposite ends of said supporting member.

3. In a device for measuring high temperatures, the combination comprising a protective outer casing of generally cylindrical shape,
a ceramic tube positioned within said casing coaxial therewith,
said tube having a portion near its outer end forming a temperature sensing element,
said tube being made of a vitrified metallic oxide having a resistance which decreases progressively with increasing temperature,
a pair of leads having end portions wrapped around said tube to form electrodes engaging the ends of said sensing element,
said leads extending through said tube to said sensing element from opposite ends of said tube,
said tube having an inner portion supporting said sensing element, a supporting tube received coaxially around said ceramic tube and within said casing, said supporting tube being spaced outwardly from said sensing element, and means on said supporting tube engaging and supporting the outer end of said ceramic tube, one of said leads extending from the outer end of said ceramic tube and between said supporting tube and said casing.

4. In a device for measuring high temperatures, the combination comprising a protective casing having a generally cylindrical side wall, a temperature sensing element disposed within said casing and made of a material having progressively decreasing resistance with increasing temperature, said sensing element being in the form of a tubular nozzle positioned coaxially within said casing, first and second conductive tubes connected to opposite ends of said nozzle for conducting hot gases to and from said nozzle, said conductive tubes also constituting electrodes making electrical contact with opposite ends of said nozzle, said first conductive tube being connected to said casing, means coaxial with said nozzle for supporting said second conductive tube within said casing, and means on said casing for conducting hot gases into said first tube and out of said second tube.

5. In a device for measuring high temperatures, the combination comprising a protective generally cylindrical casing made of conductive material, a temperature sensing element positioned within said casing and made of a material having a resistance which changes progressively with increasing temperature, said sensing element being in the form of a tubular nozzle disposed along the axis of said casing, first and second conductive tubes connected to the opposite ends of said nozzle for directing hot gases into and out of said nozzle, said conductive tubes also constituting electrodes making electrical contact with the opposite ends of said nozzle, said first tube having a flange portion projecting outwardly and engaging the inside of said protective casing at a point spaced from the outer end thereof, said casing having openings in the outer end portion thereof for conducting hot gases to said first tube, and means disposed in said casing coaxial with said nozzle for supporting said second tube, said second tube having openings therein for conducting gases from said second tube into the inner portion of said casing, said inner portion of said casing forming a conduit for conducting gases away from said second tube.

6. In a device for measuring high temperatures, the combination comprising a protective generally cylindrical casing made of conductive material, a temperature sensing element positioned within said casing and made of a material having a resistance which changes progressively with increasing temperature, said sensing element being in the form of a tubular nozzle disposed along the axis of said casing, first and second conductive tubes connected to the opposite ends of said nozzle for directing hot gases into and out of said nozzle, said conductive tubes also constituting electrodes making electrical contact with the opposite ends of said nozzle, said first tube having a flange portion projecting outwardly and engaging the inside of said protective casing at a point spaced from the outer end thereof, said casing having openings in the outer end portion thereof for conducting hot gases to said first tube, and means disposed in said casing coaxial with said nozzle for supporting said second tube, said second tube having openings therein for conducting gases from said second tube into the inner portion of said casing, said inner portion of said casing forming a conduit for conducting gases away from said second tube, said first tube having bypass openings therein for directing some of the incoming hot gases around the outside of said nozzle.

7. In a device for measuring high temperatures, the combination comprising a generally cylindrical conductive casing having an outer end portion with opening means therein for admitting hot gases, a temperature sensing element positioned within said casing near the outer end thereof, said sensing element being made of a ceramic material having a progressively decreasing electrical resistance with increasing temperature, said sensing element being in the form of a tubular nozzle disposed along the axis of said casing, first and second conductive electrodes engaging opposite ends of said nozzle and disposed in coaxial relation thereto, said first electrode forming a transverse wall in said casing and engaging the inside thereof, said first electrode having axial opening means therein for conducting hot gases into said nozzle, said first electrode having bypass opening means therein disposed between the outside of said nozzle and the inside of said casing for bypassing some of the incoming hot gases around the outside of said nozzle, said second electrode having opening means therein for conducting the hot gases away from said nozzle, said casing having means for conducting the gases away from said second electrode, and means coaxial with said nozzle for supporting said second electrode in said casing.

8. In a device for measuring high temperatures, the combination comprising a generally cylindrical conductive casing having an outer end portion with opening means therein for admitting hot gases, a temperature sensing element positioned within said casing near the outer end thereof, said sensing element being made of a ceramic material having a progressively decreasing electrical resistance with increasing temperature, said sensing element being in the form of a tubular nozzle disposed along the axis of said casing, first and second conductive electrodes engaging opposite ends of said nozzle and disposed in coaxial relation thereto, said first electrode forming a transverse wall in said casing and engaging the inside thereof, said first electrode having axial opening means therein for conducting hot gases into said nozzle, said first electrode having bypass opening means therein disposed between the outside of said nozzle and the inside of said casing for bypassing some of the incoming hot gases around the outside of said nozzle, said second electrode having opening means therein for conducting the hot gases away from said nozzle, said casing having means for conducting the gases away from said second electrode, and axially disposed supporting means within said casing for supporting said second electrode, said supporting means comprising an axially slidable member connected to said second electrode and supporting said second electrode for axial movement, and spring means acting against said axially slidable member for pressing said second electrode against said nozzle so that said nozzle is compressed axially between said first and second electrodes.

9. In a device for measuring high temperatures, the combination comprising a protective casing,
a temperature sensing element positioned axially within said casing and made of a ceramic material having progressively decreasing electrical resistance with increasing temperature,
said sensing element being in the form of a cylinder disposed around the axis of said casing,
an axial electrode embedded in said cylinder along the axis thereof, a cylindrical electrode disposed around and electrically contacting the outside of said cylinder,
supporting means disposed within said casing in coaxial relation to said sensing element and supporting said cylindrical electrode,
an axial lead connected to said axial electrode,
and spring means for continuously applying tension to said axial lead.

10. In a device for measuring high temperatures, the combination comprising a protective casing,
a temperature sensing element positioned axially in said casing and made of a ceramic material having a progressively decreasing resistance with increasing temperature,
said sensing element being in the form of a disk having an axial opening therein,
a first circular electrode making electrical contact with one side of said disk,
an axial lead connected to said first electrode and extending through said axial opening in said disk,
said axial opening being larger than said axial lead to provide spacing between said lead and the inside of said opening,
a second annular electrode making electrical contact with the opposite side of said disk,
a supporting tube supporting said second electrode and disposed coaxially relative to said disk,
said axial lead extending within said supporting tube along the axis thereof,
and means for continuously applying tension to said axial lead so that said disk is compressed between said first and second electrodes.

11. In a device for measuring high temperatures, the combination comprising a protective casing,
a temperature sensing element positioned in said casing and made of a ceramic material having a progressively decreasing resistance with increasing temperature,
said sensing element being in the form of a disk having an opening therein,
a first circular electrode making electrical contact with one side of said disk,
a lead connected to said first electrode and extending through said opening in said disk,
said opening being larger than said lead to provide spacing between said lead and the inside of said opening,
a second annular electrode making electrical contact with the opposite side of said disk,
means supporting said second electrode in said casing,
and means for continuously tensioning said lead so that said disk is compressed between said first and second electrodes.

References Cited by the Examiner

UNITED STATES PATENTS

| | | | |
|---|---|---|---|
| 822,338 | 6/1906 | Bennett | 73—362 X |
| 2,120,374 | 6/1938 | Ruben | 73—362 X |

LOUIS R. PRINCE, *Primary Examiner.*

D. McGIEHAN, *Assistant Examiner.*